(12) United States Patent
Nogaj, Jr. et al.

(10) Patent No.: US 11,794,630 B1
(45) Date of Patent: Oct. 24, 2023

(54) CARGO RESTRAINT SYSTEM

(71) Applicant: Pytho LLC, Dunlap, IL (US)

(72) Inventors: Robert John Nogaj, Jr., Dunlap, IL (US); Aaron James DeSalvio, Mahomet, IL (US)

(73) Assignee: Pytho LLC, Dunlap, IL (US)

( * ) Notice: Subject to any disclaimer, the term of this patent is extended or adjusted under 35 U.S.C. 154(b) by 710 days.

(21) Appl. No.: 16/707,147

(22) Filed: Dec. 9, 2019

Related U.S. Application Data

(60) Provisional application No. 62/778,057, filed on Dec. 11, 2018.

(51) Int. Cl.
  *B60R 9/00* (2006.01)
  *B60P 7/08* (2006.01)

(52) U.S. Cl.
  CPC ................... *B60P 7/0876* (2013.01); *B60P 7/0823* (2013.01)

(58) Field of Classification Search
  CPC ....... B60P 7/0876; B60P 7/0823; B60P 7/135; B60P 7/14; B60R 9/06; B60P 3/40; B60P 7/04; B60J 7/104
  USPC ........ 224/400, 402, 403, 404, 405, 493, 534; 410/117-118
  See application file for complete search history.

(56) References Cited

U.S. PATENT DOCUMENTS

| | | | | |
|---|---|---|---|---|
| 2,624,886 | A * | 1/1953 | Herman | D06H 5/00 428/172 |
| 5,050,924 | A * | 9/1991 | Hansen | B60P 7/0876 410/97 |
| 5,620,040 | A * | 4/1997 | Swanner | B60J 7/10 160/264 |
| 6,003,929 | A * | 12/1999 | Birdsell | B60P 7/0876 52/3 |
| 6,626,620 | B1* | 9/2003 | Veal | B60P 7/06 410/97 |
| 8,740,525 | B2* | 6/2014 | Coury et al. | B60P 7/0876 410/118 |
| 2006/0273615 | A1* | 12/2006 | Ricks, Jr. | B60P 7/0876 296/100.16 |
| 2008/0173684 | A1* | 7/2008 | Kyasky | B60P 3/40 224/403 |

FOREIGN PATENT DOCUMENTS

GB  2138366 A * 10/1984 ............... B60P 7/0876

* cited by examiner

*Primary Examiner* — Nathan J Newhouse
*Assistant Examiner* — Matthew T Theis
(74) *Attorney, Agent, or Firm* — Buckert Patent & Trademark Law Firm PC; John F. Buckert

(57) ABSTRACT

A cargo restraint system for securing cargo on a truck bed of a truck is provided. The cargo restraint system includes a cargo retaining sheet having first and second end portions and an interior sheet portion disposed between the first and second end portions. The first and second end portions extend parallel to a longitudinal axis of the cargo retaining sheet and are spaced apart from another and form first and second apertures, respectively, therein. The cargo restraint system further includes a first adjustable length strap that extends through the first aperture in the cargo retaining sheet and is attachable to the truck. The cargo restraint system further includes a second adjustable length strap that extends through the second aperture in the cargo retaining sheet and is attachable to the truck.

1 Claim, 19 Drawing Sheets

US 11,794,630 B1

1

CARGO RESTRAINT SYSTEM

CROSS-REFERENCE TO RELATED APPLICATIONS

This application claims priority to U.S. Provisional Pat. Application No. 62/778,057 filed on Dec. 11, 2018, the entire contents of which are hereby incorporated by reference herein.

BACKGROUND

When carrying extended length cargo in the back of any vehicle, it is important that the cargo is properly secured to prevent dislodgement and damage to people and other vehicles that are disposed behind the loaded vehicle. A known cargo restraining product utilizes a porous cargo net. A drawback with this known cargo restraining product is that it is not effective at restraining long pipes, or thin pieces of wood or metal. Other known cargo restraining products utilize ratchet straps or tie-downs to secure cargo and rely on friction to prevent the cargo from sliding from under the straps or tie-downs. A drawback with these products is that a user must balance between securing the cargo tightly enough such that the cargo will not become dislodged and loose enough such that the straps will not cause damage to the cargo--which can be difficult to achieve quickly during use.

The inventors herein have recognized a need for an improved cargo restraint system that minimizes the above-mentioned drawbacks.

SUMMARY

A cargo restraint system for securing cargo on a truck bed of a truck in accordance with an exemplary embodiment is provided. The cargo restraint system includes a cargo retaining sheet having first and second end portions and an interior sheet portion disposed between the first and second end portions. The first and second end portions extend parallel to a longitudinal axis of the cargo retaining sheet and are spaced apart from another. The first end portion is folded back onto the interior sheet portion, and the first end portion is coupled to the interior sheet portion utilizing a first plurality of stitches extending through the first end portion and the interior sheet portion such that a first aperture is formed by the first end portion and extends parallel to the longitudinal axis along a longitudinal length of the cargo retaining sheet. The second end portion is folded back onto the interior sheet portion, and the second end portion is coupled to the interior sheet portion utilizing a second plurality of stitches extending through the second end portion and the interior sheet portion such that a second aperture is formed by the second end portion and extends parallel to the longitudinal axis along the longitudinal length of the cargo retaining sheet. The cargo restraint system further includes a first adjustable length strap that extends through the first aperture in the cargo retaining sheet and is attachable to the truck. The cargo restraint system further includes a second adjustable length strap that extends through the second aperture in the cargo retaining sheet and is attachable to the truck.

2

Figure 1:
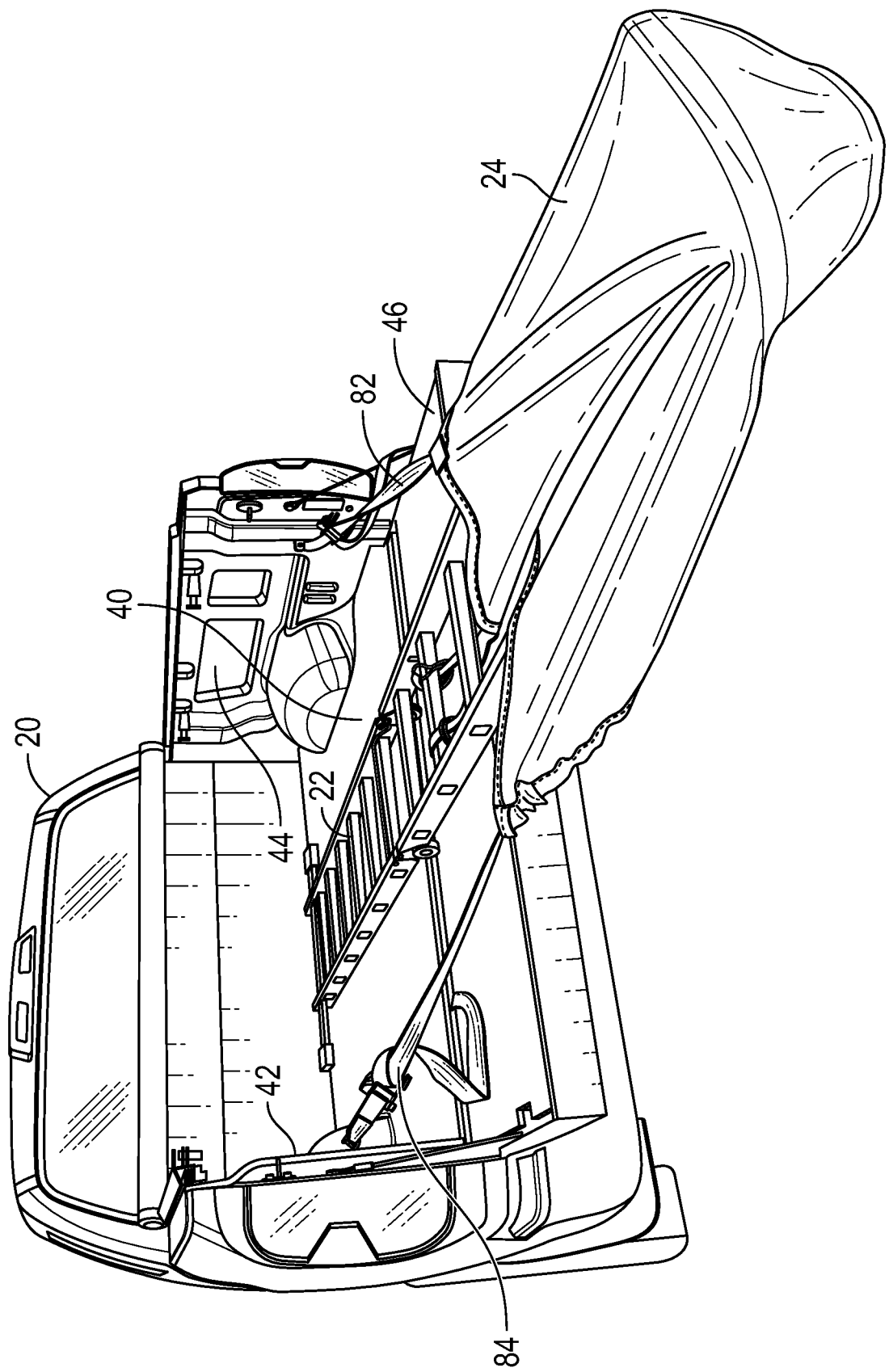
FIG. 1 is a schematic of truck having a ladder disposed therein, and the ladder is secured to the truck utilizing a cargo restraint system in accordance with an exemplary embodiment.
Figure 2:
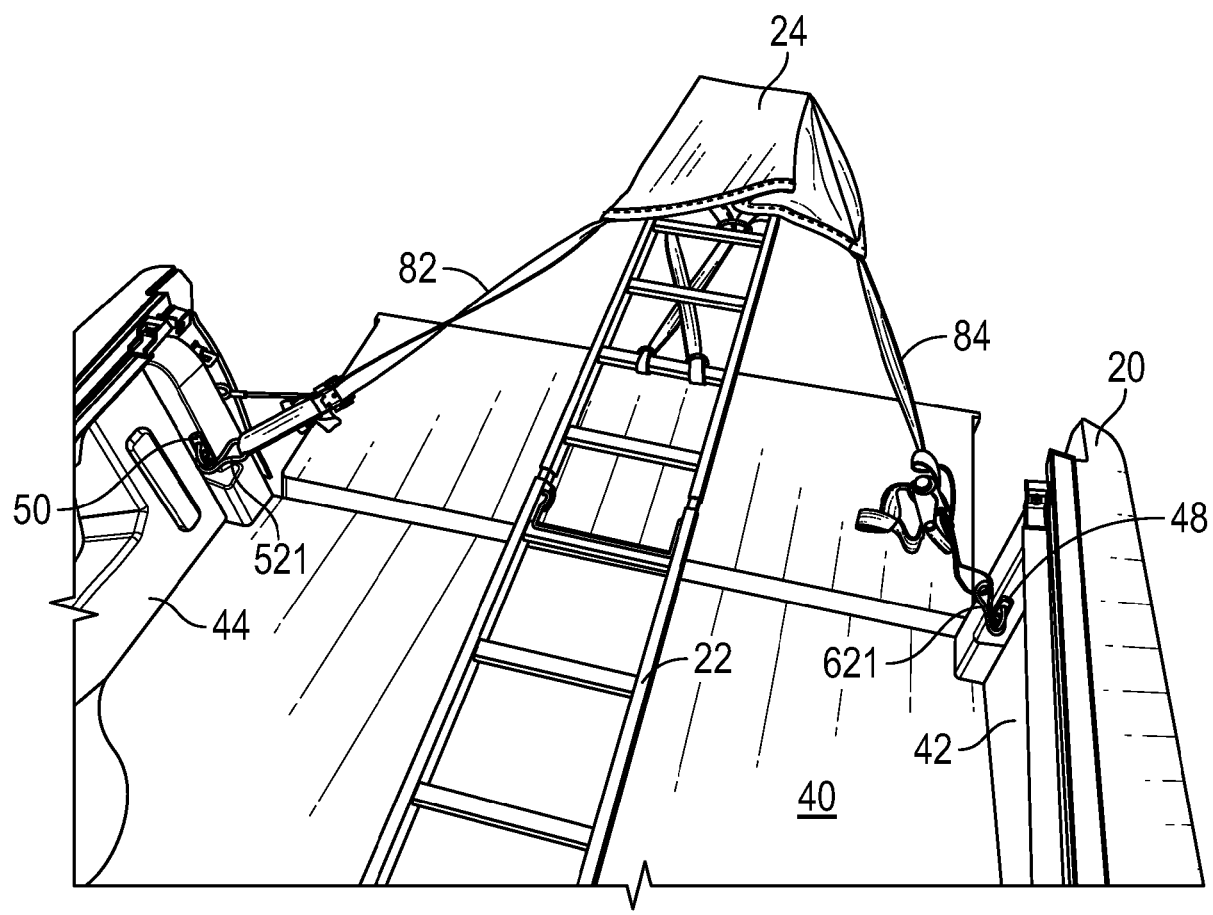
Figure 3:
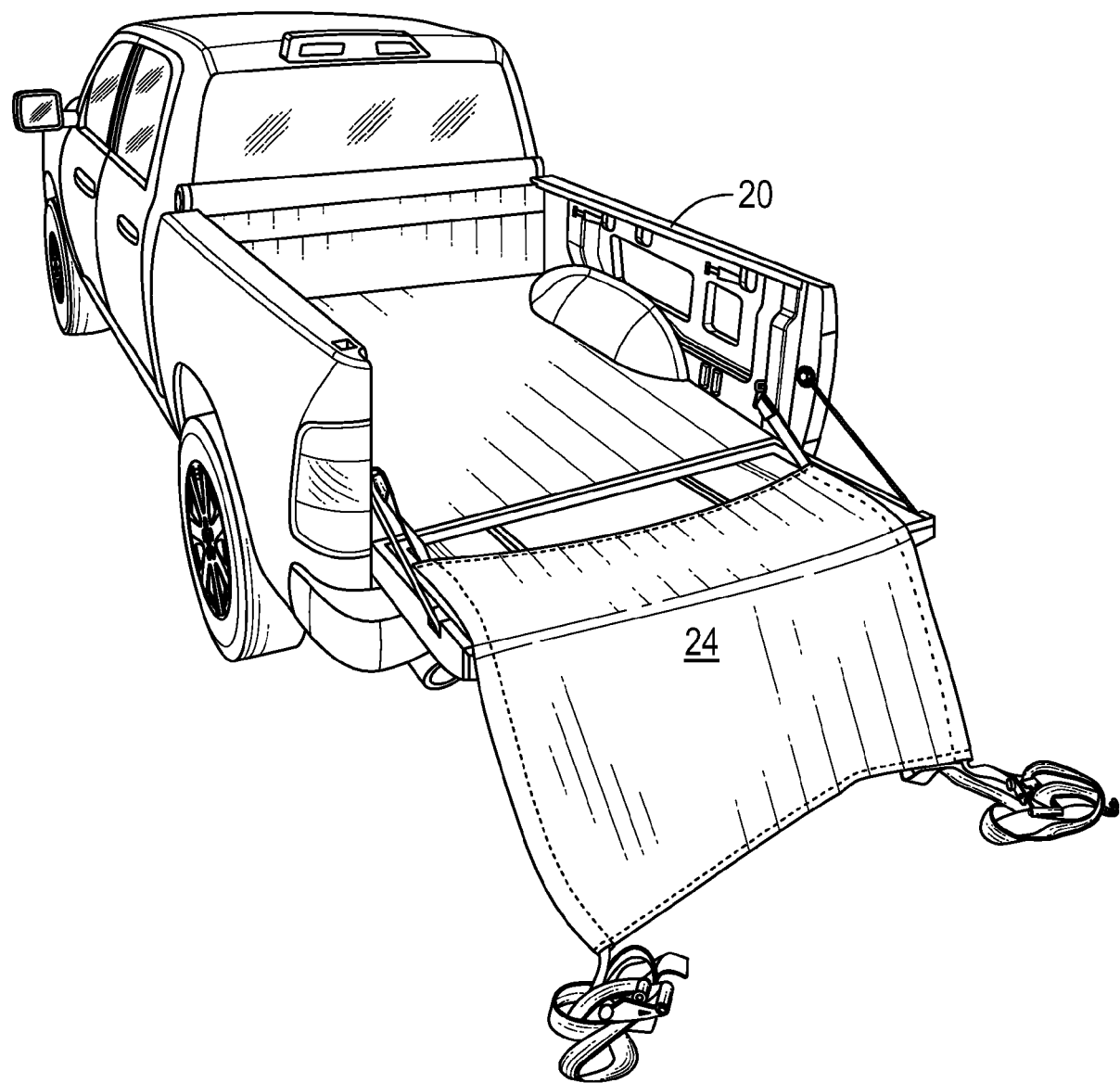
Figure 4:
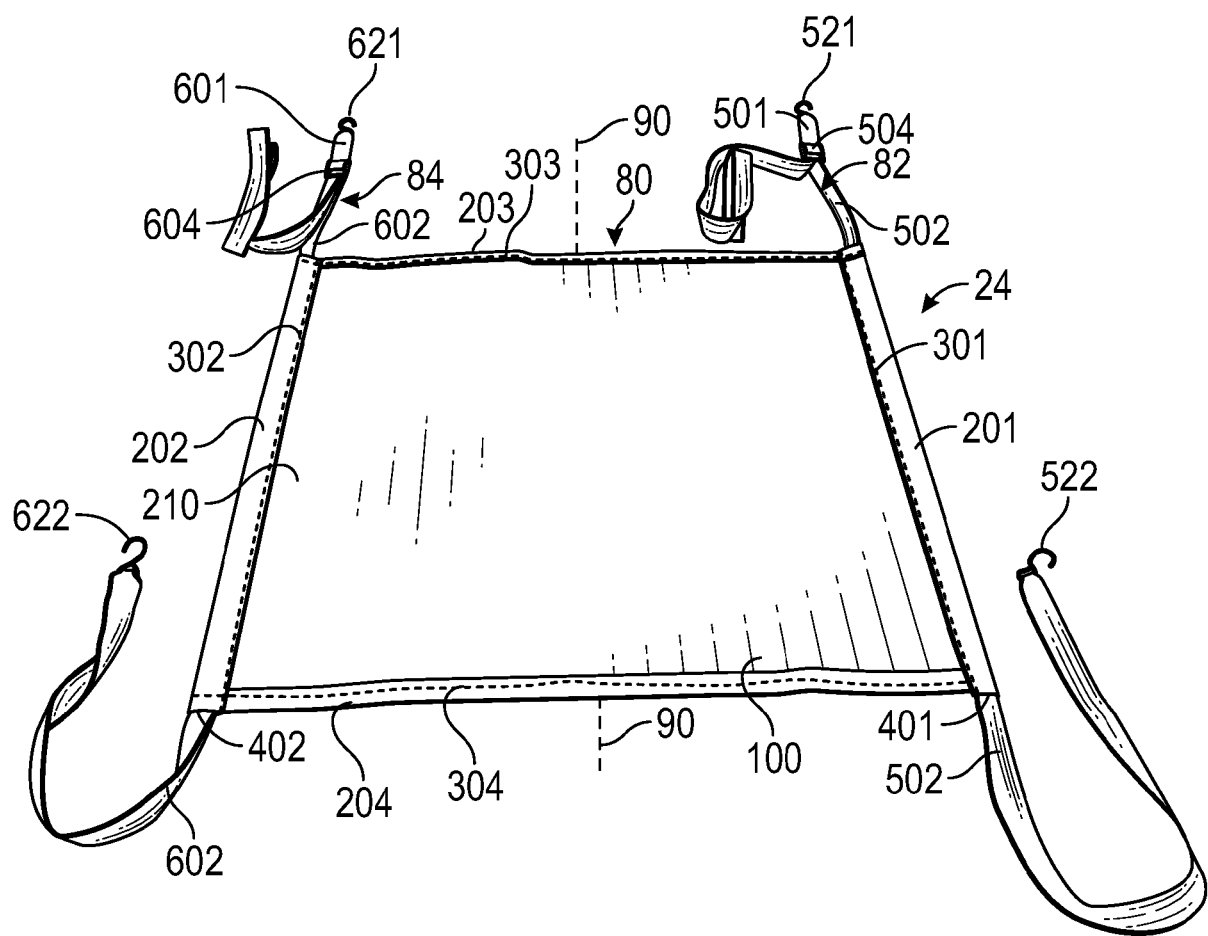
Figure 5:
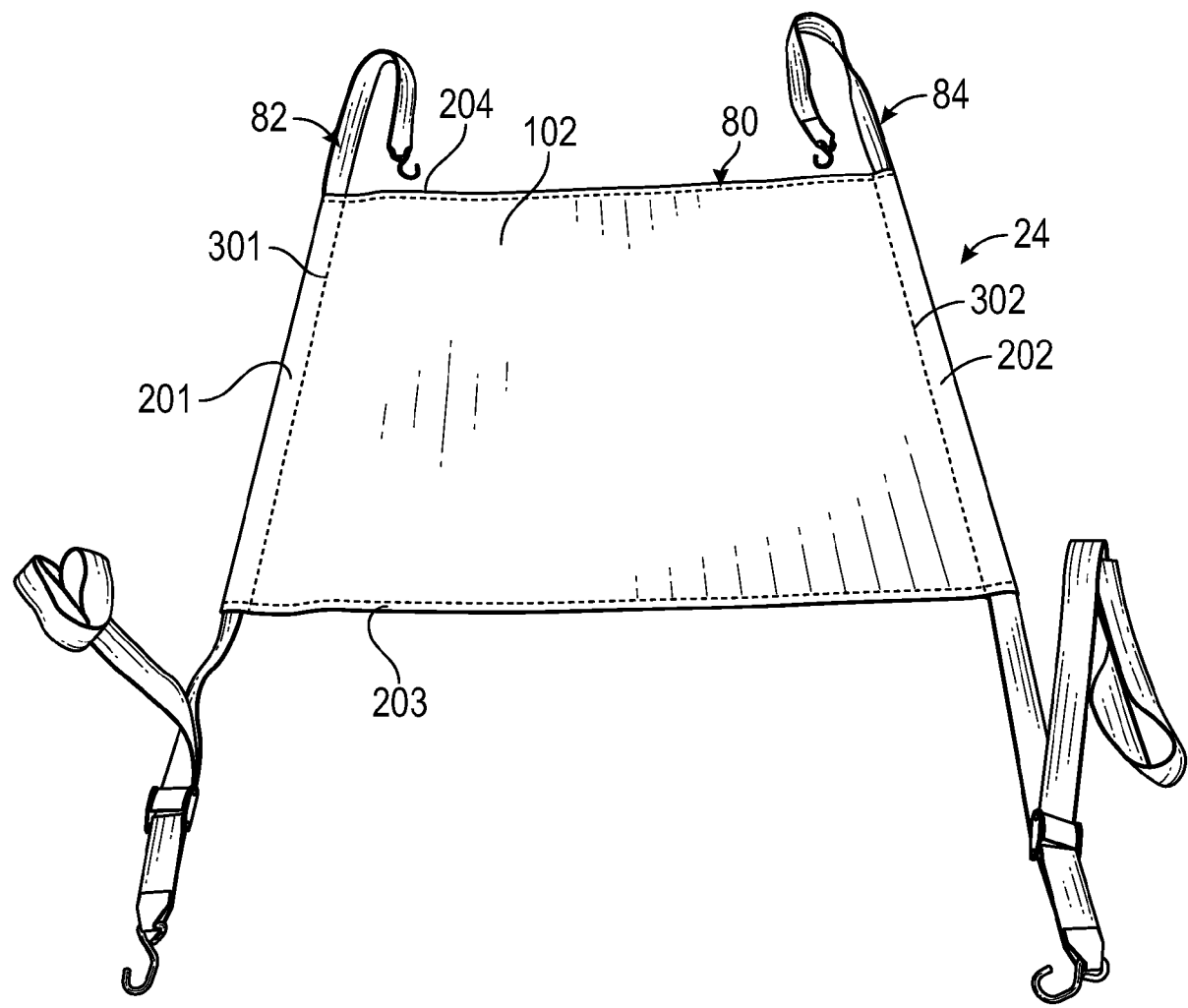
Figure 6:
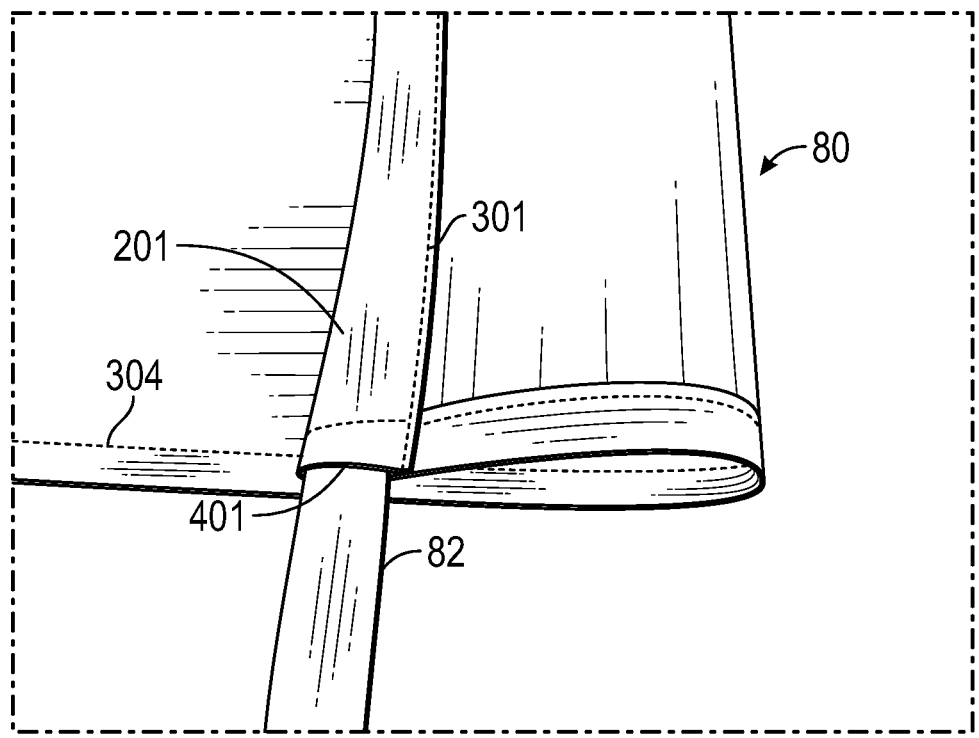
Figure 7:
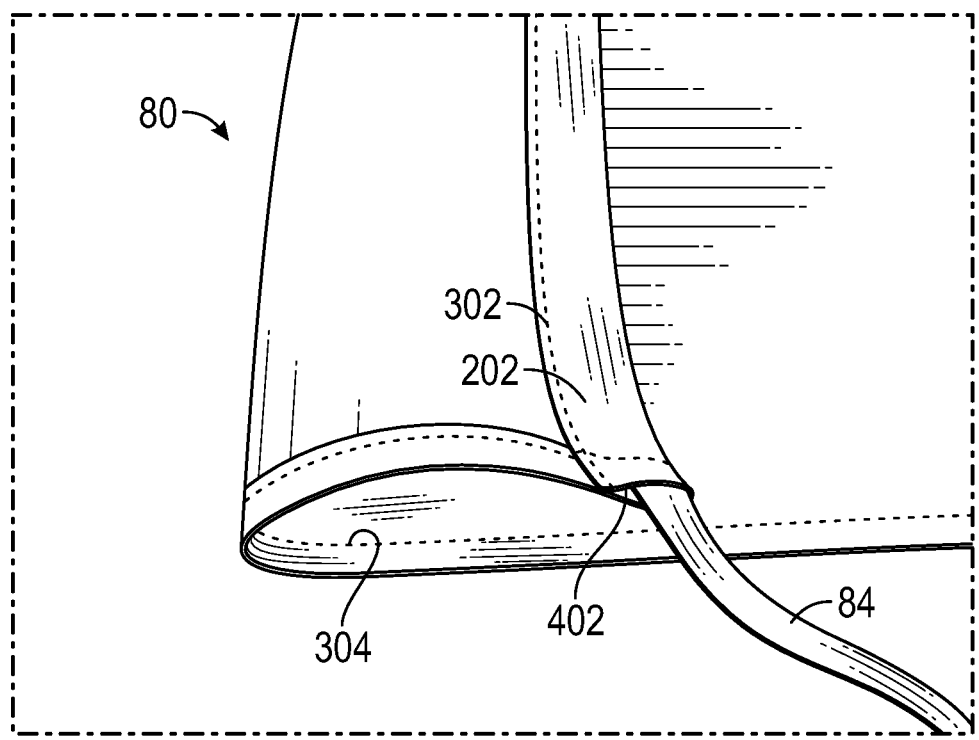
Figure 8:
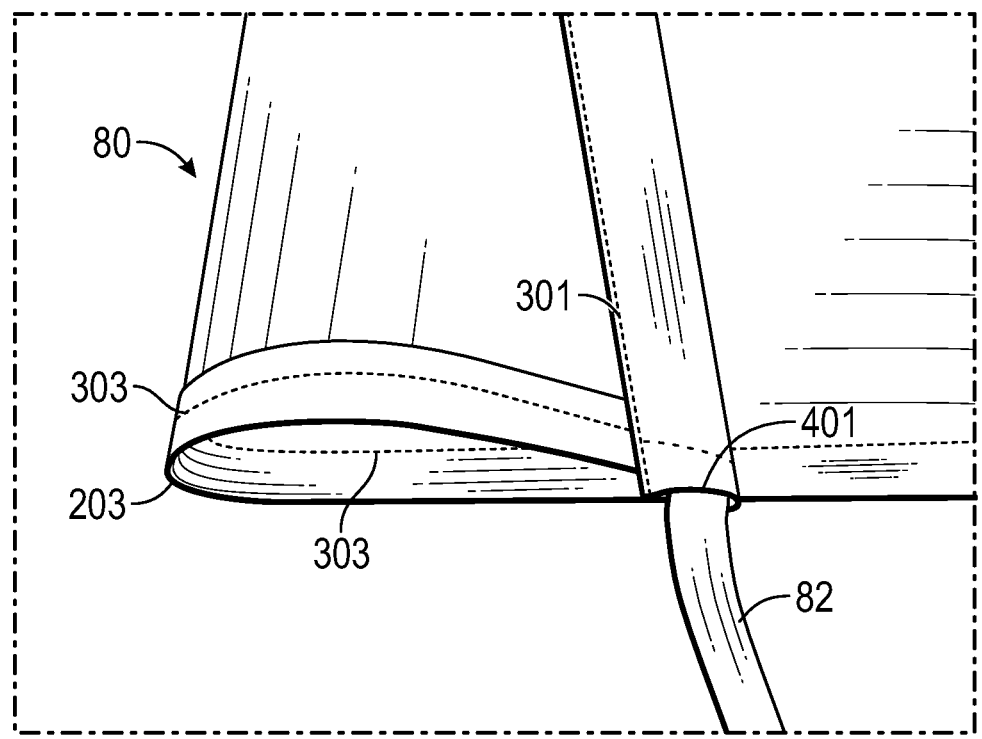
Figure 9:
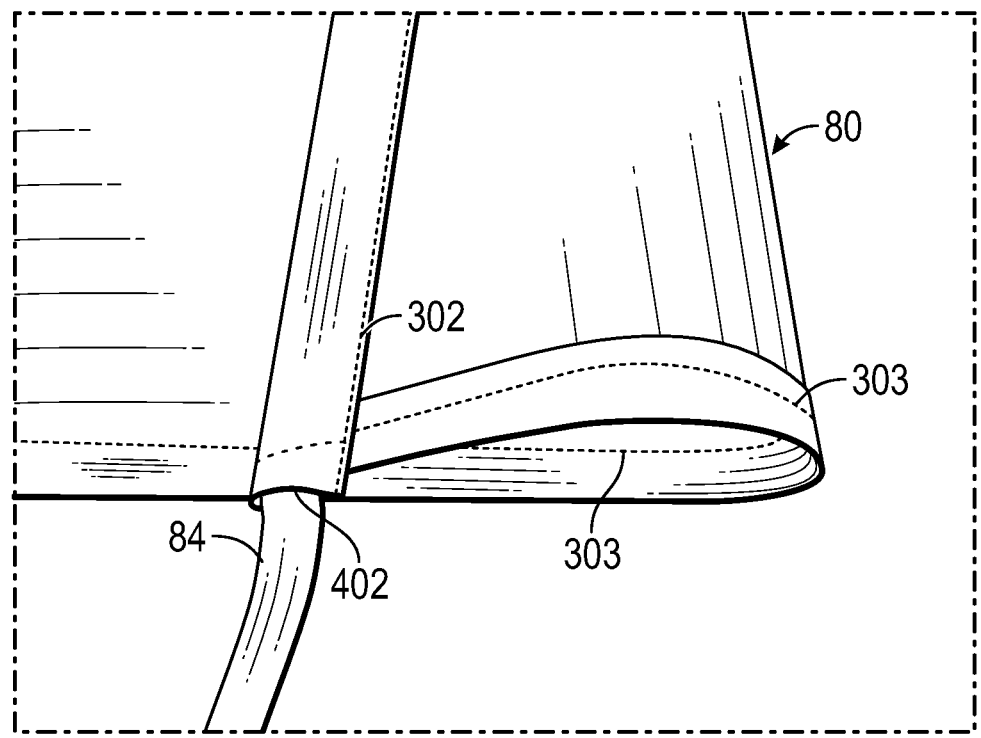
Figure 10:
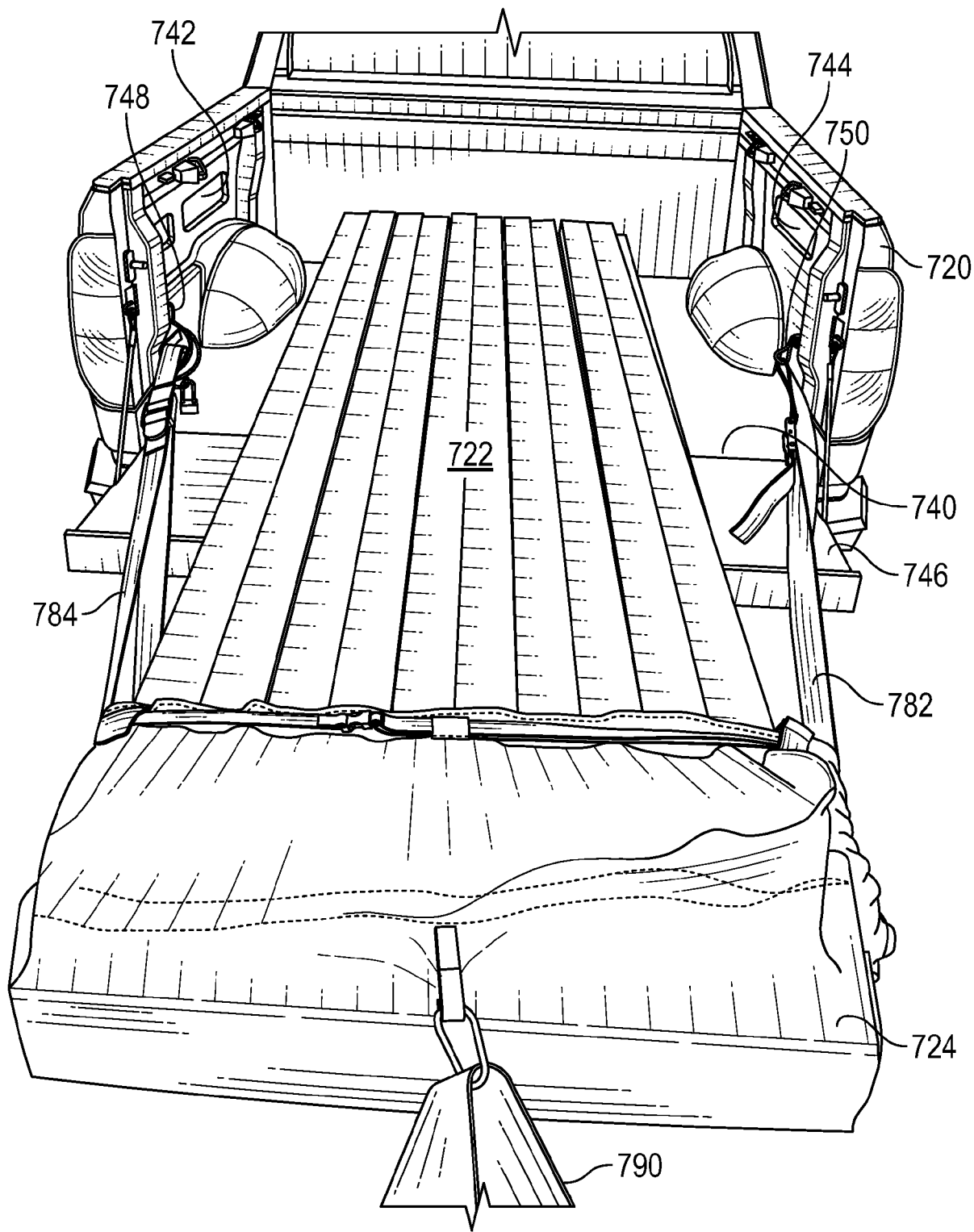
Figure 11:
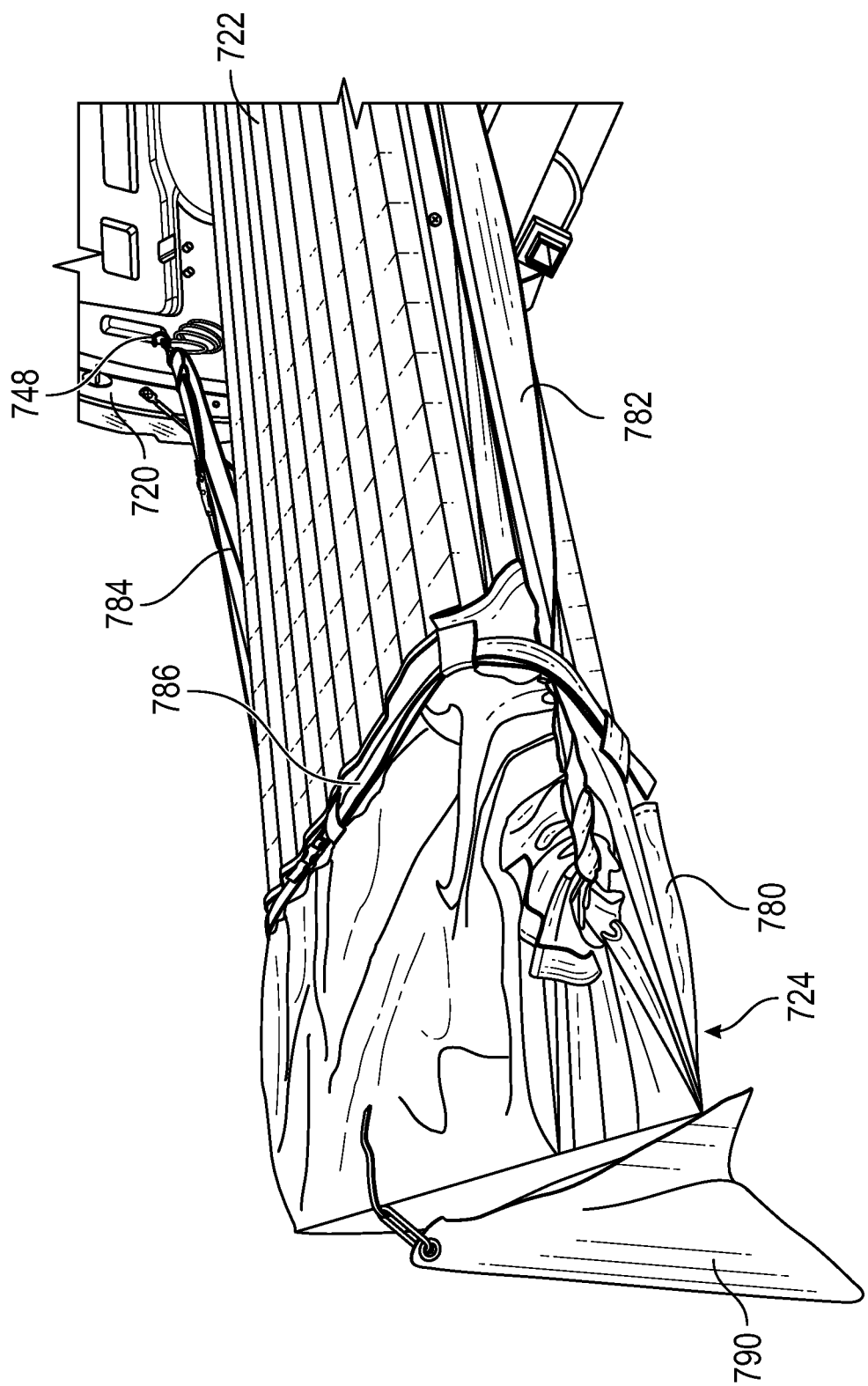
Figure 12:
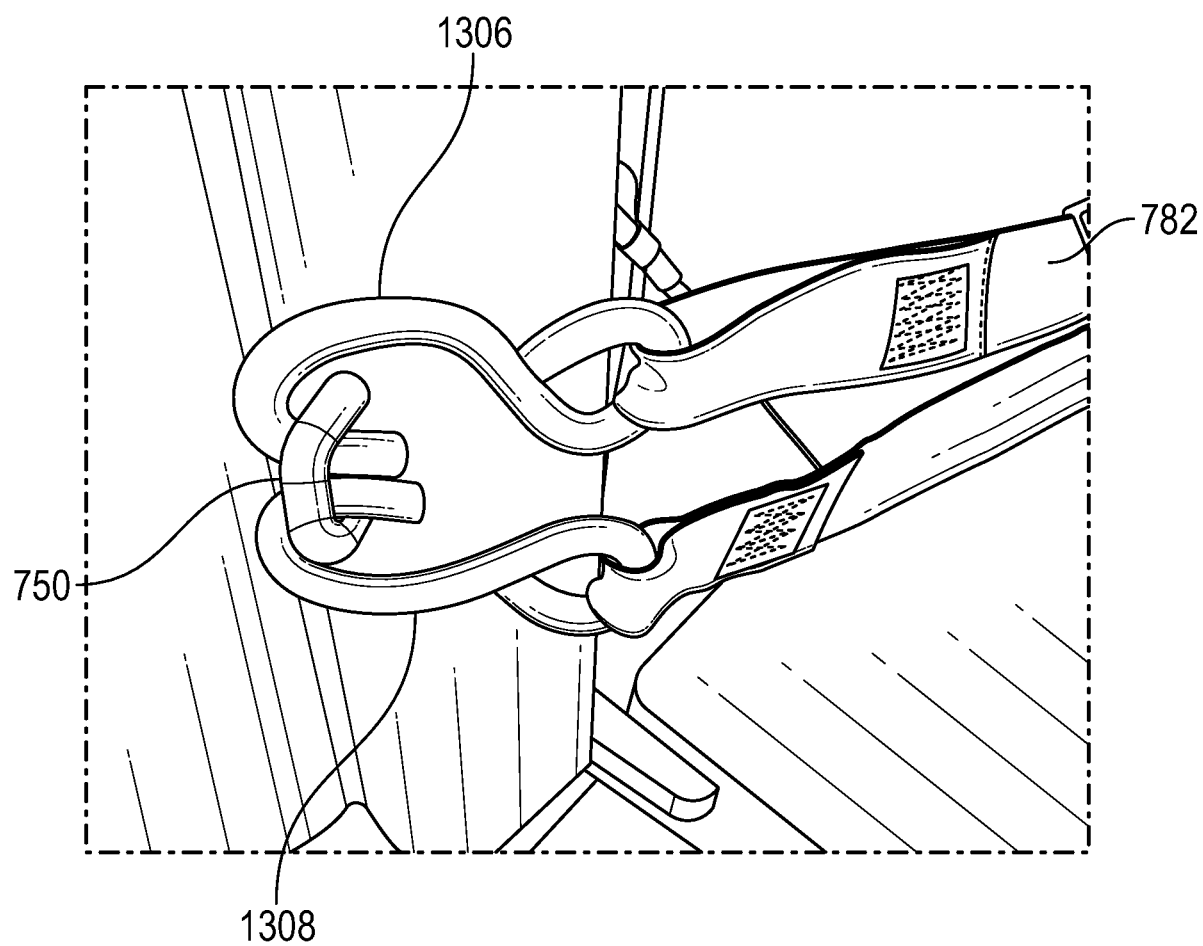
Figure 13:
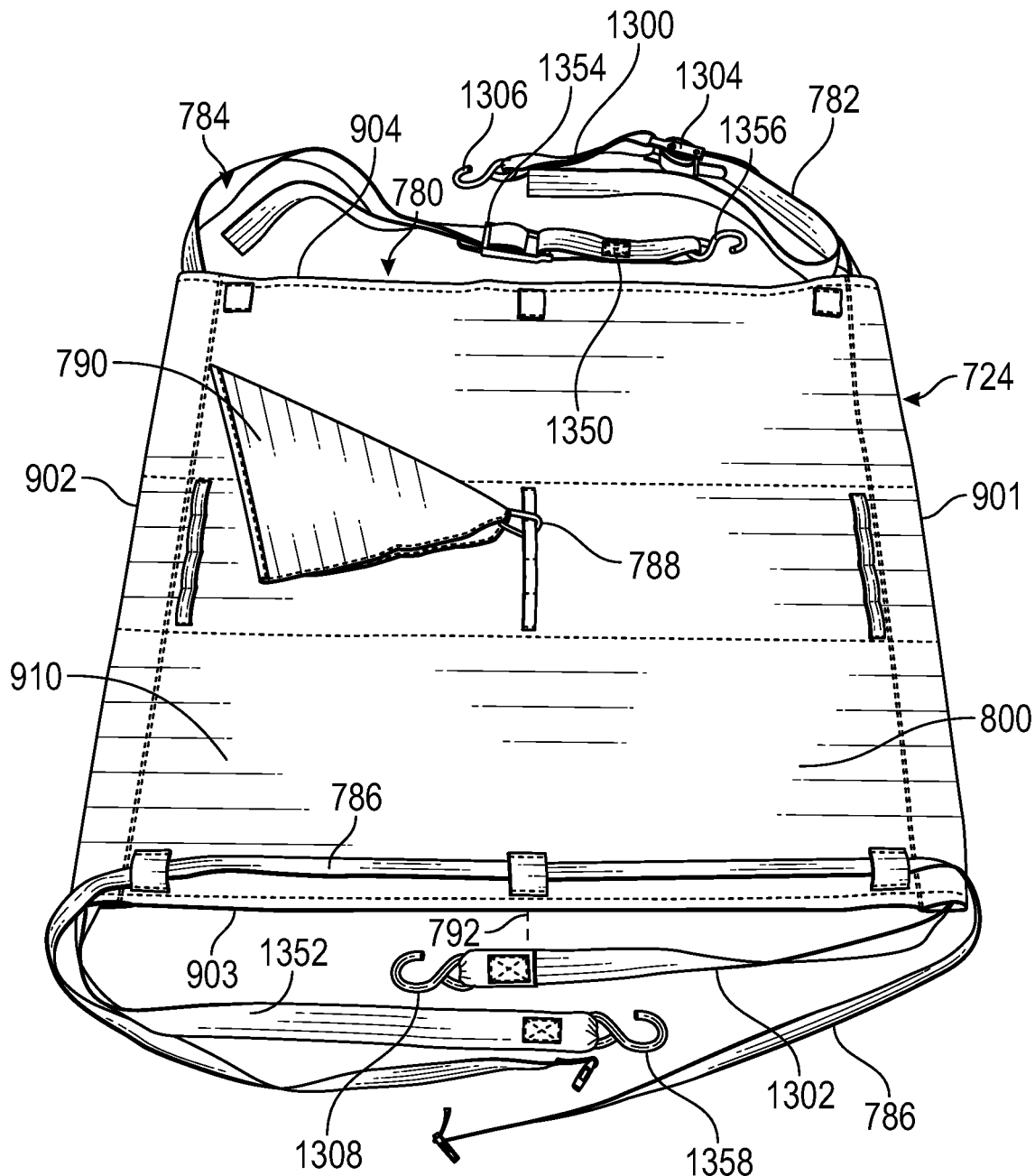
Figure 14:
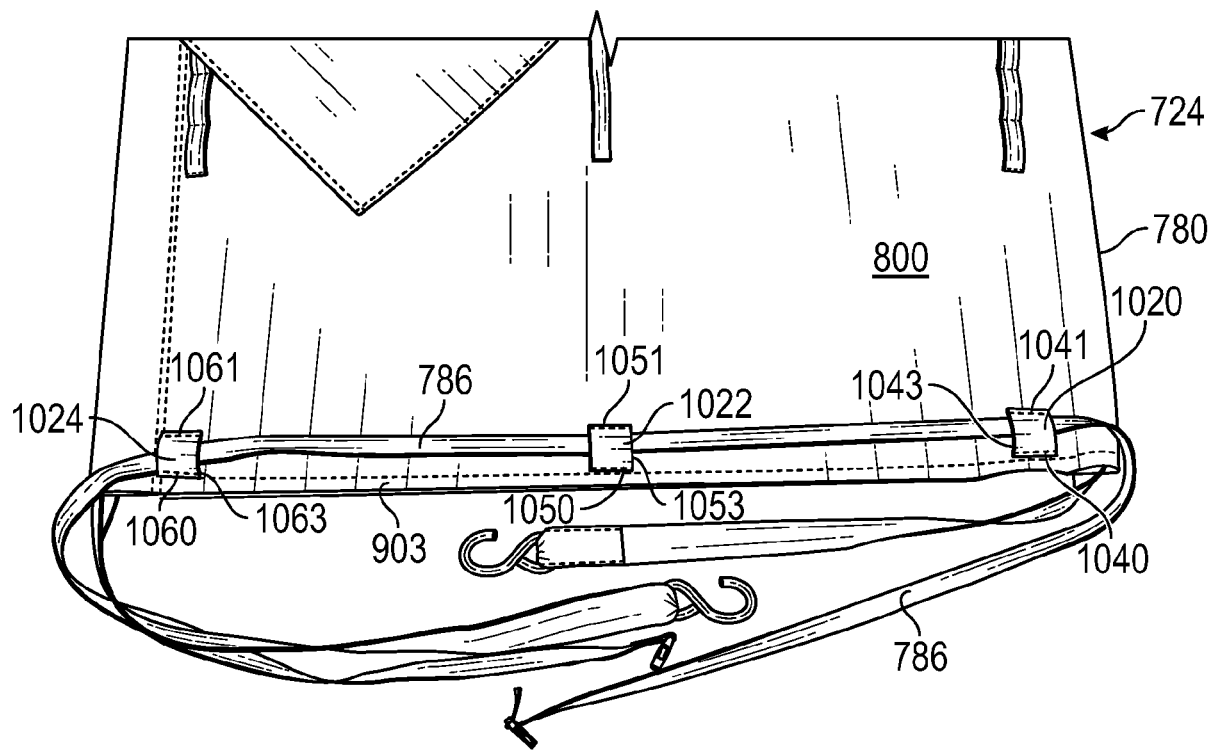
Figure 15:
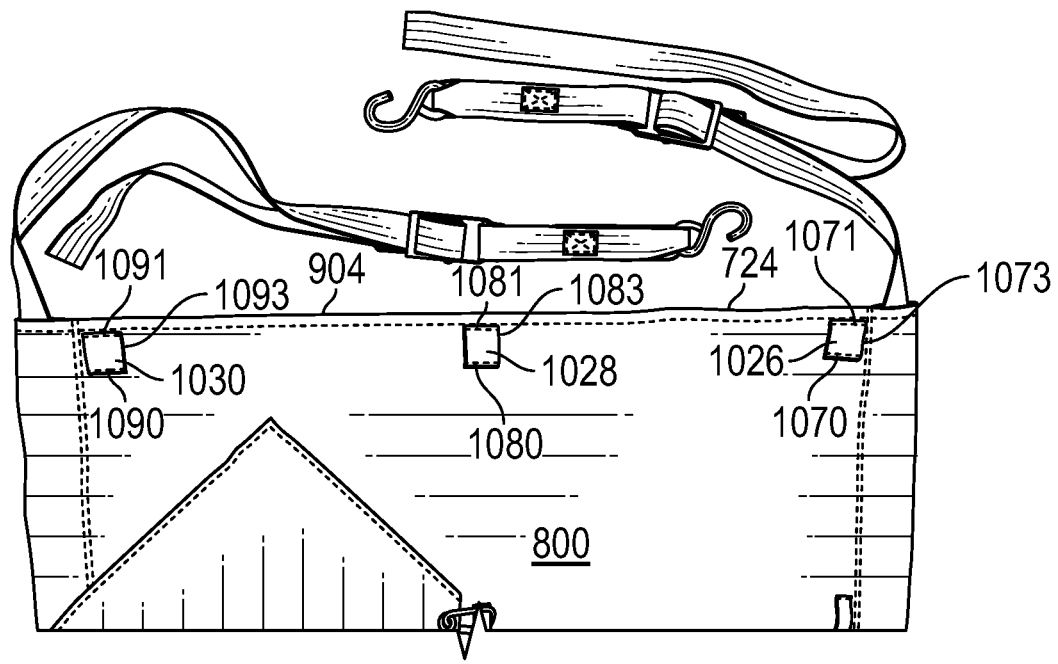
Figure 16:
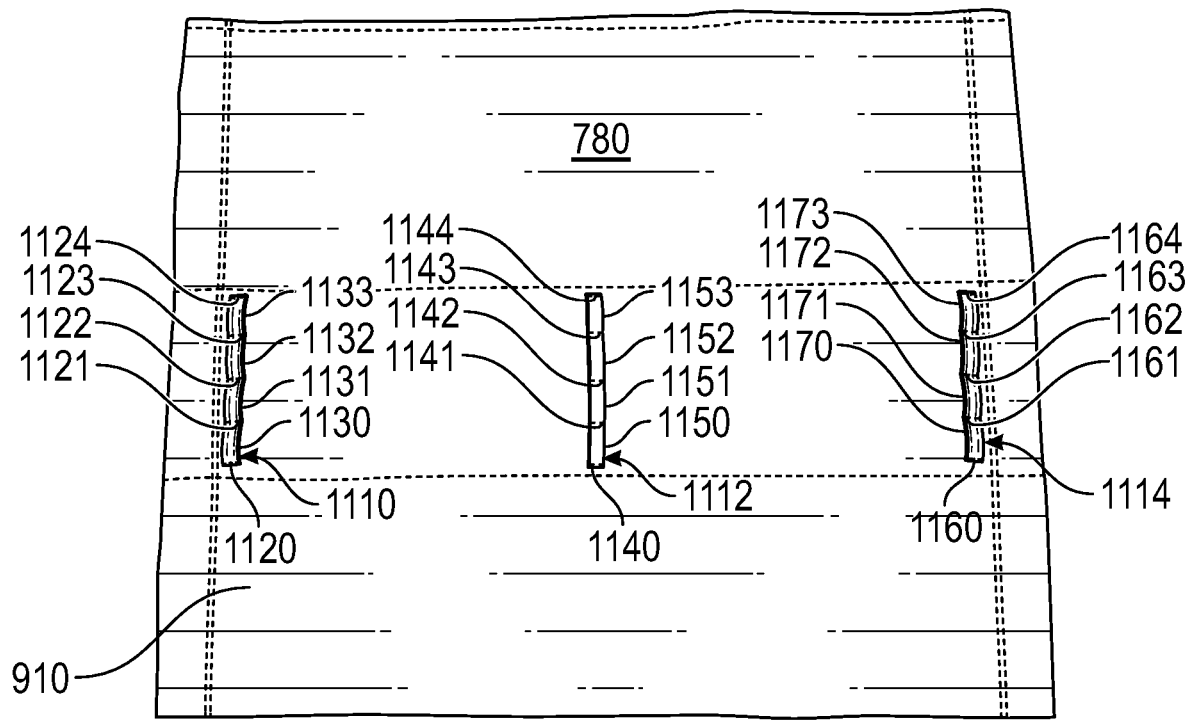
Figure 17:
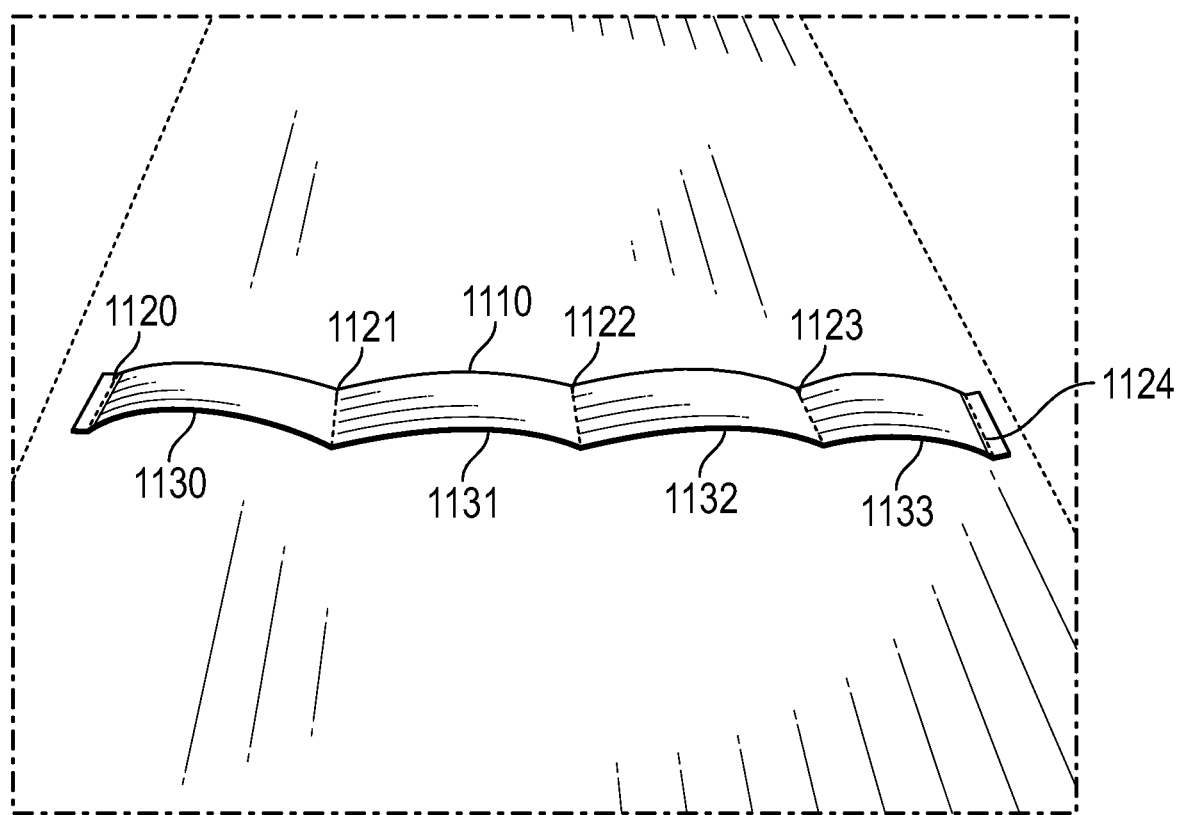
Figure 18:
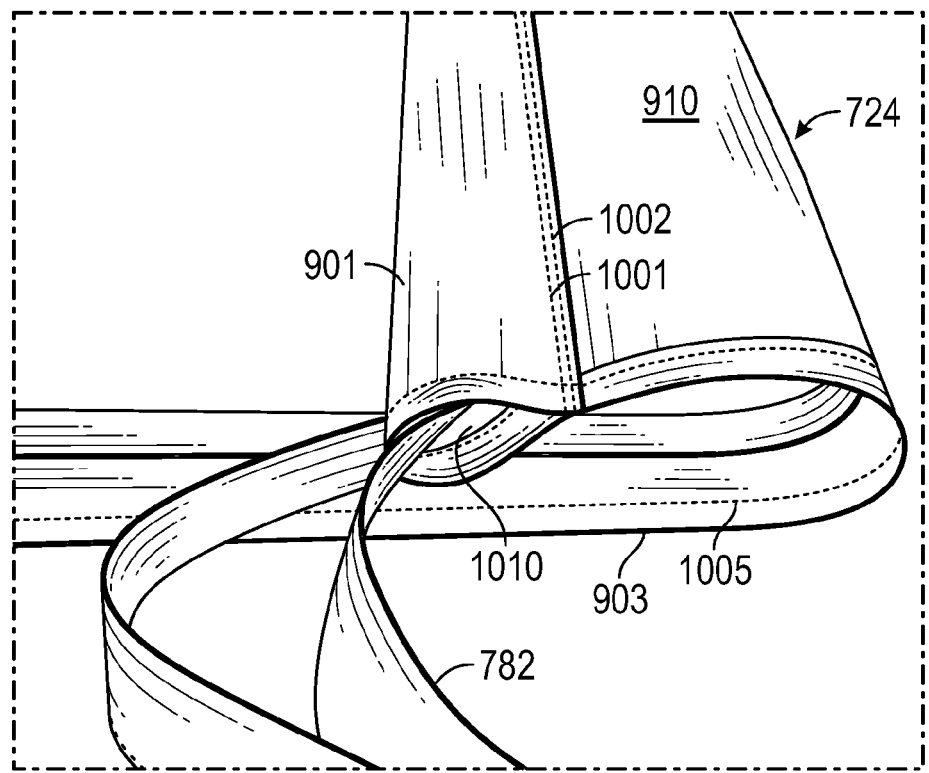
Figure 19:
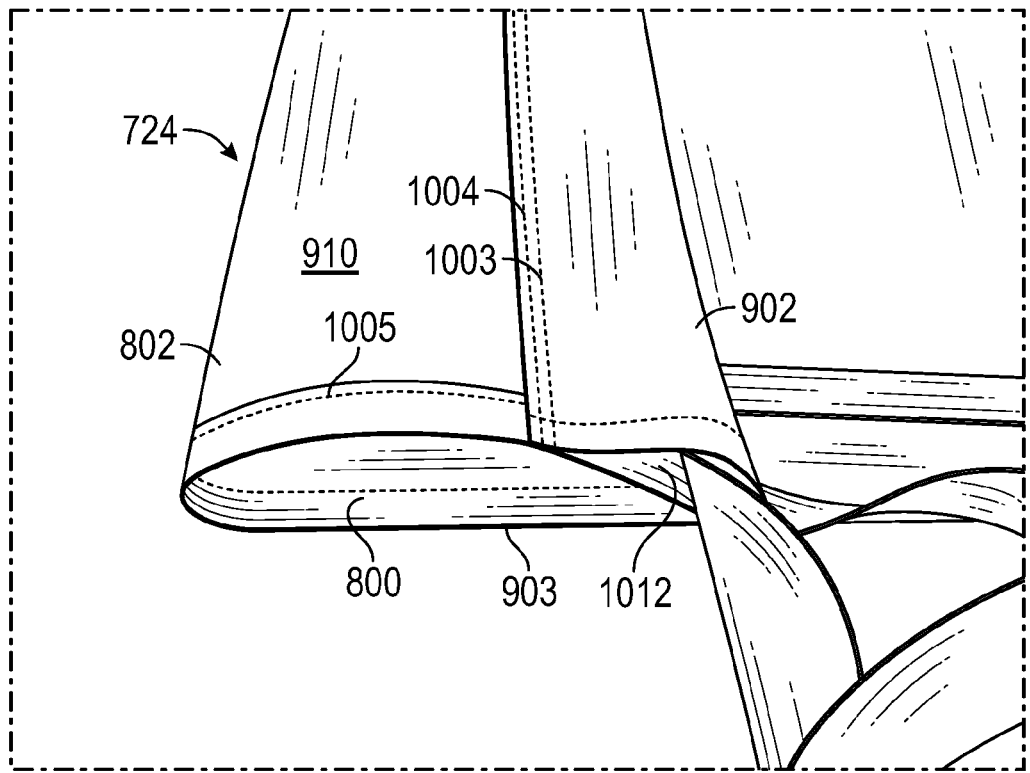
Figure 20:
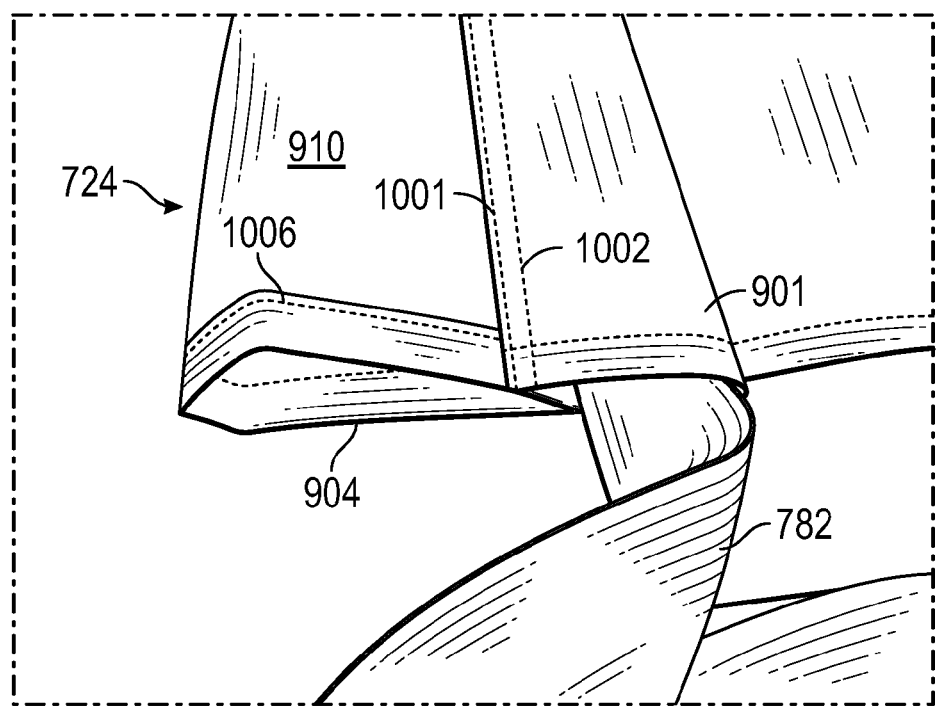
Figure 21:
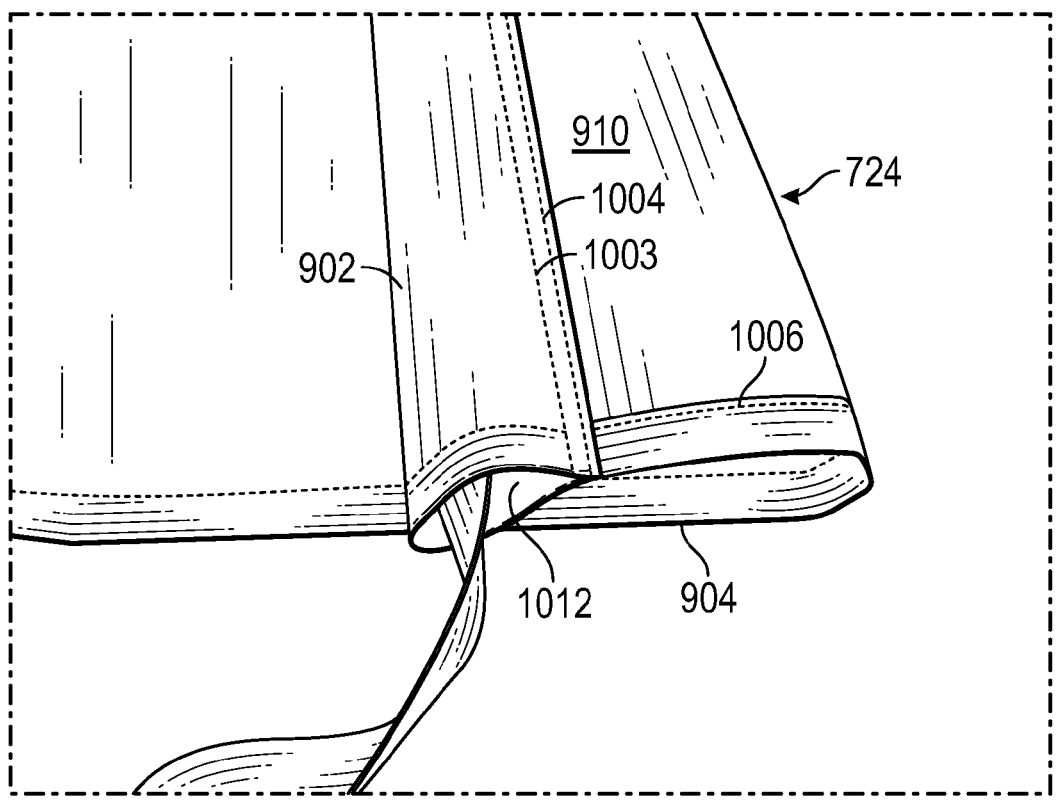
Figure 22:
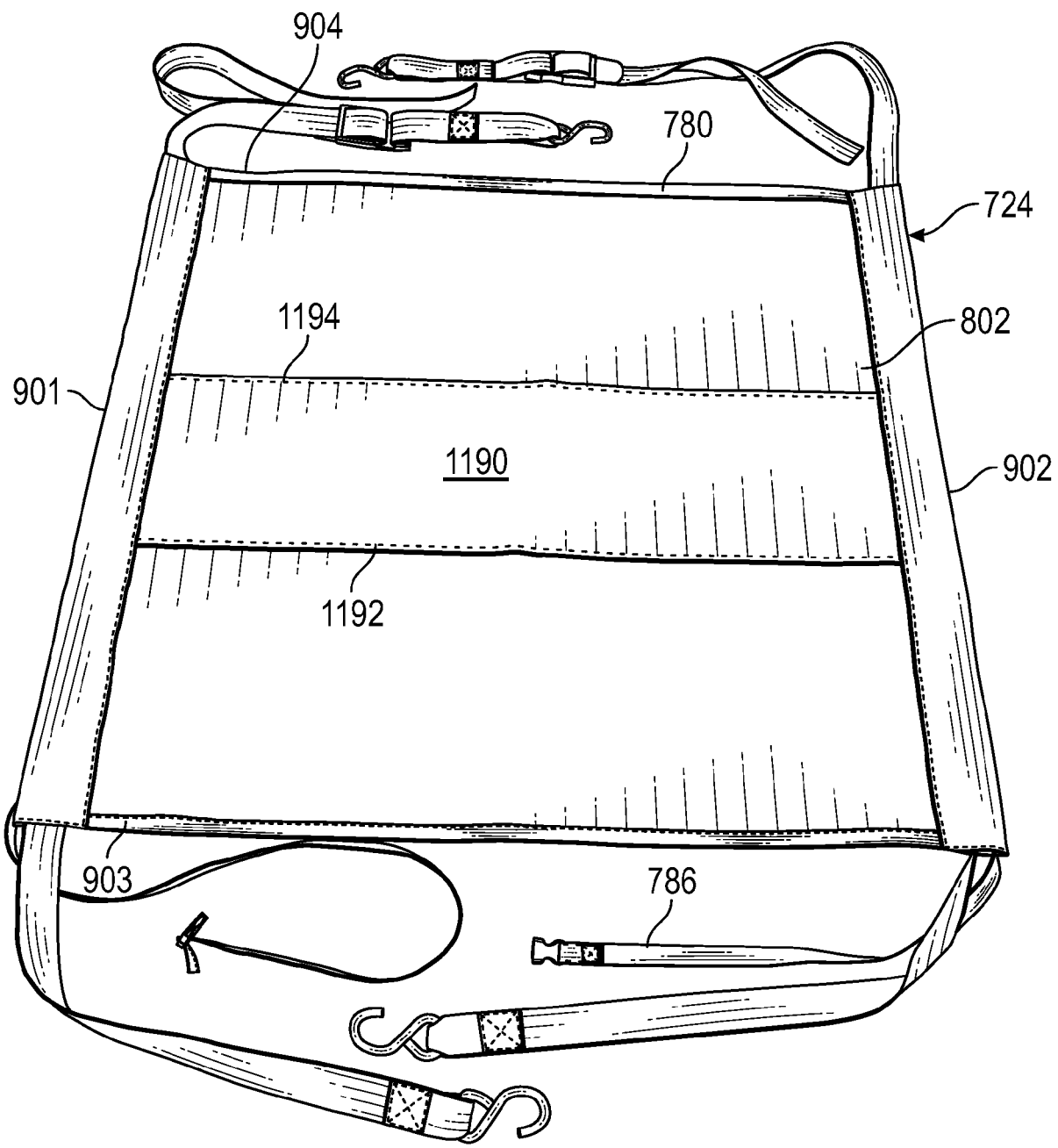
Figure 23:
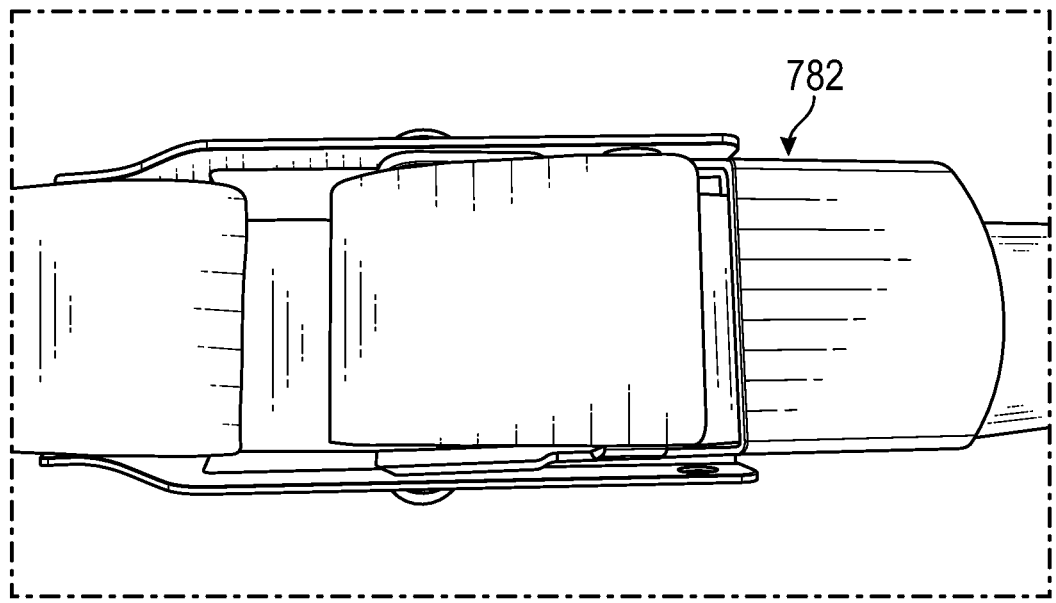
Figure 24:
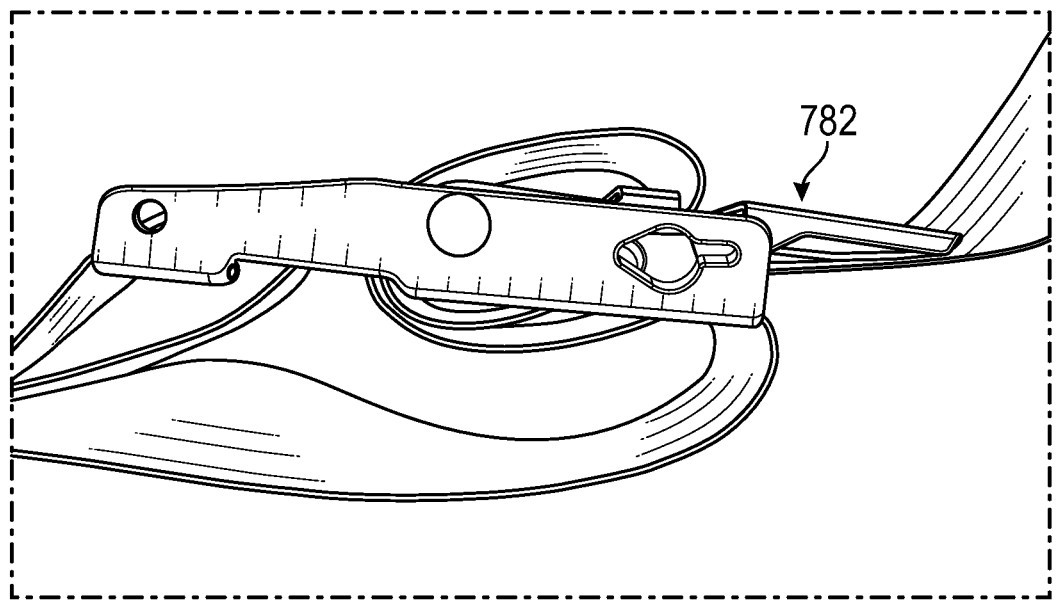

FIG. 2 is a top view of a portion of the truck, a portion of the ladder, and the cargo restraint system of FIG. 1;

FIG. 3 is a schematic of the truck and the cargo restraint system of FIG. 1 before the ladder is secured to the truck utilizing the cargo restraint system;

FIG. 4 is a schematic of a first side of a cargo retaining sheet of the cargo restraint system of FIG. 1;

FIG. 5 is a schematic of a second side of the cargo retaining sheet of the cargo restraint system of FIG. 1;

FIG. 6 is a schematic of a portion of the cargo retaining sheet of FIG. 4 having a first end portion forming a first aperture therein, and a third end portion;

FIG. 7 is a schematic of a portion of the cargo retaining sheet of FIG. 4 having a second end portion forming a second aperture therein, and the third end portion;

FIG. 8 is another schematic of a portion of the cargo retaining sheet of FIG. 4 having the first end portion and a fourth end portion thereof; and FIG. 9 is another schematic of a portion of the cargo retaining sheet of FIG. 4 having the second end portion and a fourth end portion thereof;

FIG. 10 is a schematic of a truck having a plurality of boards disposed therein, and the plurality of boards is secured to the truck utilizing a cargo restraint system in accordance with another exemplary embodiment;

FIG. 11 is a perspective view of a portion of the truck, a portion of the plurality of boards, and the cargo restraint system of FIG. 10;

FIG. 12 is an enlarged view of a portion of a truck bed of the truck of FIG. 10 having an attachment bracket thereon;

FIG. 13 is a schematic of a first side of the cargo restraint system of FIG. 10 having a cargo retaining sheet, first and second adjustable straps, an adjustable cinch strap, a carabiner, and a flag;

FIG. 14 is an enlarged view of a portion of the cargo restraint system of FIG. 13;

FIG. 15 is an enlarged view of another portion of the cargo restraint system of FIG. 13;

FIG. 16 is an enlarged view of a portion the cargo retaining sheet of the cargo restraint system of FIG. 13;

FIG. 17 is an enlarged view of a portion of the cargo retaining sheet of FIG. 16;

FIG. 18 is a schematic of a portion of the cargo retaining sheet of FIG. 13 having a first end portion forming a first aperture therein, and a third end portion;

FIG. 19 is a schematic of a portion of the cargo retaining sheet of FIG. 13 having the first end portion forming a second aperture therein, and the third end portion;

FIG. 20 is another schematic of a portion of the cargo retaining sheet of FIG. 13 having the first end portion and a fourth end portion thereof; and FIG. 21 is another schematic of a portion of the cargo retaining sheet of FIG. 13 having the second end portion and the fourth end portion thereof;

FIG. 22 is a schematic of a second side of the cargo restraint system of FIG. 13 having the cargo retaining sheet, the first and second adjustable straps, and the adjustable cinch strap;

FIG. 23 is a schematic of a portion of the first adjustable length strap of FIG. 13 having an over-center buckle;

FIG. 24 is another schematic of the over-center buckle of FIG. 23; and

Figure 25:
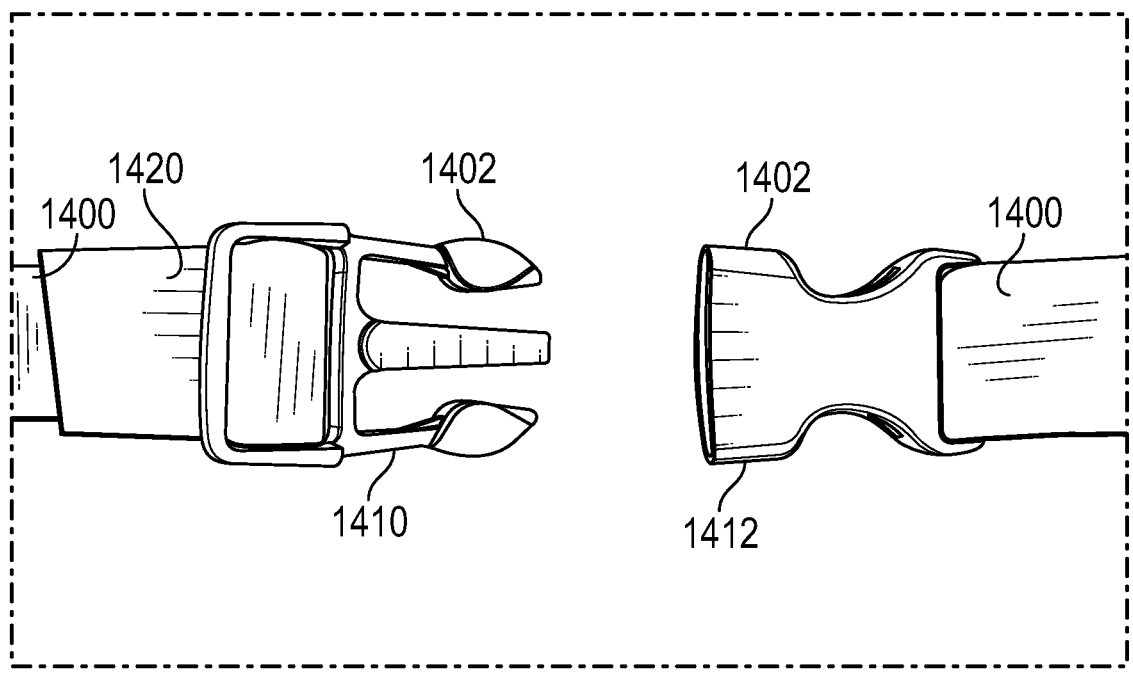

FIG. 25 is a schematic of a portion of the adjustable length cinch strap of FIG. 13 having a side squeeze buckle.

DETAILED DESCRIPTION

Referring to FIGS. 1-3, a truck 20, a ladder 22, and a cargo restraint system 24 in accordance with an exemplary embodiment are illustrated.

The truck 20 includes a truck bed 40, side walls 42, 44, a tailgate 46, and attachment brackets 48, 50. The side walls 42, 44 extend upwardly from the truck bed 40 on opposite sides of the truck bed 40. The tailgate 46 is rotatably coupled to an end of the truck bed 40. The attachment brackets 48, 50 are attached to the side walls 42, 44, respectively, for receiving hooks therein to secure cargo in the truck bed 40.

The ladder 22 is disposed in the truck bed 40, and the ladder 22 is secured to the truck bed 40 and the side walls 42, 44 utilizing the cargo restraint system 24 that is attached to both the attachment brackets 48, 50 and to the ladder 22. It is noted that other cargo could be secured to the truck bed 40 by the cargo restraint system 24.

Referring to FIGS. 4-9, the cargo restraint system 24 in accordance with an exemplary embodiment will now be explained. The cargo restraint system 24 includes a cargo retaining sheet 80 and first and second adjustable length straps 82, 84.

An advantage of the cargo restraint system 24 is that the system 24 allows a user to quickly and securely fasten cargo while simultaneously preventing the cargo from being damaged or dislodged during transit. The cargo restraint system 24 utilizes a solid cargo retaining sheet 80 that encloses and secures cargo and eliminates the drawback of allowing smaller items to pass through a cargo net. Also, the cargo retaining sheet 80 encloses cargo vertically by having upper and lower sections thereof disposed on the top and bottom portions, respectively, of an extended part of the cargo, as well as longitudinally securing the cargo by folding the sheet over the cargo.

The cargo retaining sheet 80 is a solid canvas cargo retaining sheet that is substantially rectangular-shaped and extends along a longitudinal axis 90. The cargo retaining sheet 80 includes first and second sides 100, 102, first, second, third, fourth end portions 201, 202, 203, 204, an interior sheet portion 210, first, second, third, fourth plurality of stitches 301, 302, 303, 304, and first and second apertures 401, 402.

The interior sheet portion 210 is substantially rectangular shaped and is disposed between the first, second, third, fourth end portions 201, 202, 203, 204. The first and second end portions 201, 200 extend parallel to the longitudinal axis 90 and are spaced apart from another. The third and fourth end portions 203, 204 extend perpendicular to the longitudinal axis 90 and are spaced apart from another.

The first end portion 201 is folded back onto the interior sheet portion 210, and the first end portion 201 is coupled to the interior sheet portion 210 utilizing a first plurality of stitches 301. The first plurality of stitches extend through and are interwoven between the first end portion 201 and the interior sheet portion 210 such that a first aperture 401 is formed by the first end portion 201 and extends parallel to the longitudinal axis 90 along a longitudinal length of the cargo retaining sheet 80.

The second end portion 202 is folded back onto the interior sheet portion 210, and the second end portion 202 is coupled to the interior sheet portion 210 utilizing a second plurality of stitches 302. The second plurality of stitches 302 extend through and are interwoven between the second end portion 202 and the interior sheet portion 210 such that a second aperture 402 is formed by the second end portion 202 and extends parallel to the longitudinal axis 90 along the longitudinal length of the cargo retaining sheet 80.

The third end portion 203 is folded back onto the interior sheet portion 210, and the third end portion 203 is coupled to the interior sheet portion 210 utilizing a third plurality of stitches 303. The third plurality of stitches 303 extend through and are interwoven between the third end portion 203 and the interior sheet portion 210 and extend perpendicular to the longitudinal axis 90 of the cargo retaining sheet 80.

The fourth end portion 204 is folded back onto the interior sheet portion 210, and the fourth end portion 204 is coupled to the interior sheet portion 210 utilizing a fourth plurality of stitches 304. The fourth plurality of stitches 304 extend through and are interwoven between the fourth end portion 204 and the interior sheet portion 210 and extend perpendicular to the longitudinal axis 90 of the cargo retaining sheet 80.

Referring to FIGS. 2 and 4, the first adjustable length strap 82 extends through the first aperture 401 in the cargo retaining sheet 80 and is attachable to the truck 20. The first adjustable length strap 82 includes first and second strap portions 501, 502, a cam buckle 504, and first and second hooks 521, 522. The first strap portion 501 is coupled to the first hook 521 and to the cam buckle 504. The second strap portion 502 is coupled to the cam buckle 504, extends to the aperture 401, and is coupled to the second hook 522. The cam buckle 504 allows a user to adjust an effective length of the second strap portion 502. As illustrated, the first hook 521 is attached to the attachment bracket 50 (shown in FIG. 2) of the truck 20, and the second hook 522 is attached to the ladder 22.

The second adjustable length strap 84 extends through the second aperture 402 in the cargo retaining sheet 80 and is attachable to the truck 20. The second adjustable length strap 84 includes first and second strap portions 601, 602, a cam buckle 604, and first and second hooks 621, 622. The second strap portion 601 is coupled to the first hook 621 and to the cam buckle 604. The second strap portion 602 is coupled to the cam buckle 604, extends to the aperture 402, and is coupled to the second hook 622. The cam buckle 604 allows a user to adjust an effective length of the second strap portion 602. As illustrated, the first hook 621 is attached to the attachment bracket 48 of the truck 20, and the second hook 622 is attached to the ladder 22.

Referring to FIGS. 10-13, a truck 720, a plurality of boards 722, and a cargo restraint system 724 in accordance with another exemplary embodiment are illustrated.

The truck 720 includes a truck bed 740, side walls 742, 744, a tailgate 746, and attachment brackets 748, 750. The side walls 742, 744 extend upwardly from the truck bed 740 on opposite sides of the truck bed 740. The tailgate 746 is rotatably coupled to an end of the truck bed 740. The attachment brackets 748, 750 are attached to the side walls 742, 744, respectively, for receiving hooks therein to secure cargo in the truck bed 740.

As illustrated, the cargo comprises a plurality of boards 722 that are disposed in the truck bed 740, and the plurality of boards 722 are secured to the truck bed 740 and the side walls 742, 744 utilizing the cargo restraint system 724 that is attached to both the attachment brackets 748, 750 and to the plurality of boards 722. It is noted that other cargo could be secured to the truck bed 740 by the cargo restraint system 724.

Referring to FIGS. 13-15, the cargo restraint system 724 in accordance with another exemplary embodiment will now be explained. The cargo restraint system 724 includes a cargo retaining sheet 780, first and second adjustable length straps 782, 784, an adjustable length cinch strap 786, a carabiner 788, and a flag 790.

An advantage of the cargo restraint system 724 is that the system 724 allows a user to quickly and securely fasten cargo while simultaneously preventing the cargo from being damaged or dislodged during transit. The cargo restraint system 724 utilizes a solid cargo retaining sheet 780 that encloses and secures cargo and eliminates the drawback of allowing smaller items to pass through a cargo net. Also, the cargo retaining sheet 780 encloses cargo vertically by having upper and lower sections thereof disposed on the top and bottom portions, respectively, of an extended part of the cargo, as well longitudinally securing the cargo by folding the sheet over the cargo. The cargo restraint system 724 utilizes an adjustable length cinch strap 786 that tightly holds the sheet 780 against cargo which prevents the sheet 780 from acting like a parachute when the cargo is being transported at relatively high speeds.

Referring to FIGS. 13 and 22, the cargo retaining sheet 780 is a solid canvas cargo retaining sheet that is substantially rectangular-shaped and extends along a longitudinal axis 792. The cargo constraining sheet 780 includes first and second sides 800, 802, first, second, third, fourth end portions 901, 902, 903, 904, an interior sheet portion 910, first and second plurality of stitches 1001, 1002 (shown in FIG. 18), third and fourth plurality of stitches 1003, 1004 (shown in FIG. 19), a fifth plurality of stitches 1005 (shown in FIG. 19), a sixth plurality of stitches 1006 (shown in FIG. 20), apertures 1010, 1012 (shown in FIGS. 18 and 19 respectively), first, second, and third retaining loop portions 1020, 1022, 1024 (shown in FIG. 14), fourth, fifth, sixth retaining loop portions 1026, 1028, 1030 (shown in FIG. 15), stitches 1040, 1041 and an aperture 1043 (shown in FIG. 14), stitches 1050, 1051 and an aperture 1053 (shown in FIG. 14), stitches 1060, 1061 and an aperture 1063 (shown in FIG. 14), stitches 1070, 1071 and aperture 1073 (shown in FIG. 15), stitches 1080, 1081 and an aperture 1083 (shown in FIG. 15), stitches 1090, 1091 and an aperture 1093 (shown in FIG. 15), a retaining loop portion 1110 (shown in FIGS. 16 and 17), a retaining loop portion 1112, a retaining loop portion 1114, stitches 1120, 1121, 1122, 1123, 1124, apertures 1130, 1131, 1132, 1133, stitches 1140, 1141, 1142, 1143, 1144, apertures 1150, 1151, 1152, 1153, stitches 1160, 1161, 1162, 1163, 1164, apertures 1170, 1171, 1172, 1173, a backing layer 1190 (shown in FIG. 22), and stitches 1192, 1194.

Referring to FIG. 13, the interior sheet portion 910 is substantially rectangular shaped and is disposed between the first, second, third, fourth end portions 901, 902, 903, 904. The first and second end portions 901, 902 extend parallel to the longitudinal axis 792 and are spaced apart from another. The third and fourth end portions 903, 904 extend perpendicular to the longitudinal axis 792 and are spaced apart from another.

Referring to FIGS. 18 and 20, the first end portion 901 is folded back onto the interior sheet portion 910, and the first end portion 901 is coupled to the interior sheet portion 910 utilizing a first plurality of stitches 1001 and a second plurality of stitches 1002. The first plurality of stitches 1001 extend through and are interwoven between the first end portion 901 and the interior sheet portion 910 such that a first aperture 1010 is formed by the first end portion 901 and extends parallel to the longitudinal axis 792 along a longitudinal length of the cargo retaining sheet 780. The second plurality of stitches 1002 extend through and are interwoven between the first end portion 901 and the interior sheet portion 910, and are spaced apart from the first plurality of stitches 1001 and extend parallel to the first plurality of stitches 1001 and the longitudinal axis 792. The first and second plurality of stitches 1001, 1002 are each lock stitches.

Referring to FIGS. 19 and 21, the second end portion 902 is folded back onto the interior sheet portion 910, and the second end portion 902 is coupled to the interior sheet portion 910 utilizing a third plurality of stitches 1003 and a fourth plurality of stitches 1004. The third plurality of stitches 1003 extend through and are interwoven between the second end portion 902 and the interior sheet portion 910 such that a second aperture 1012 is formed by the second end portion 902 and extends parallel to the longitudinal axis 792 along the longitudinal length of the cargo retaining sheet 780. The fourth plurality of stitches 1004 extend through and are interwoven between the second end portion 902 and the interior sheet portion 910, and are spaced apart from the third plurality of stitches 1003 and extend parallel to the third plurality of stitches 1003 and the longitudinal axis 792. The third and fourth plurality of stitches 1003, 1004 are each lock stitches.

Referring to FIGS. 18 and 19, the third end portion 903 is folded back onto the interior sheet portion 910, and the third end portion 903 is coupled to the interior sheet portion 910 utilizing a fifth plurality of stitches 1005. The fifth plurality of stitches 1005 extend through and are interwoven between the third end portion 903 and the interior sheet portion 910 and extend perpendicular to the longitudinal axis 792 of the cargo retaining sheet 780. The fifth plurality of stitches 1005 are lock stitches.

Referring to FIGS. 20 and 21, the fourth end portion 904 is folded back onto the interior sheet portion 910, and the fourth end portion 904 is coupled to the interior sheet portion 910 utilizing a sixth plurality of stitches 1006. The sixth plurality of stitches 1006 extend through and are interwoven between the fourth end portion 904 and the interior sheet portion 910 and extend perpendicular to the longitudinal axis 792 of the cargo retaining sheet 780. The sixth plurality of stitches 1006 are lock stitches.

Referring to FIG. 14, the cargo retaining sheet 780 further includes first, second, and third retaining loop portions 1020, 1022, 1024 coupled to the third end portion 903 on the first side 800 for receiving the adjustable length cinch strap 786 therethrough.

The first retaining loop portion 1020 is coupled to the third end portion 903 utilizing stitches 1040, 1041. In an exemplary embodiment, the stitches 1040, 1041 are lock stitches. The first retaining loop portion 1020 forms an aperture 1043 between the first retaining loop portion 1020 and the third end portion 903, for receiving the adjustable length cinch strap 786 therethrough. The first retaining loop portion 1020 is constructed of a canvas material.

The second retaining loop portion 1022 is coupled to the third end portion 903 utilizing stitches 1050, 1051. In an exemplary embodiment, the stitches 1050, 1051 are lock stitches. The second retaining loop portion 1022 forms an aperture 1053 between the second retaining loop portion 1022 and the third end portion 903, for receiving the adjustable length cinch strap 786 therethrough. The second retaining loop portion 1022 is constructed of a canvas material.

The third retaining loop portion 1024 is coupled to the third end portion 903 utilizing stitches 1060, 1061. In an exemplary embodiment, the stitches 1060, 1061 are lock stitches. The third retaining loop portion 1024 forms an aperture 1063 between the third retaining loop portion 1024 and the third end portion 903, for receiving the adjustable length cinch strap 786 therethrough. The third retaining loop portion 1024 is constructed of a canvas material.

Referring to FIG. 15, the cargo retaining sheet 780 further includes fourth, fifth, and sixth retaining loop portions 1026, 1028, 1030 coupled to the fourth end portion 904 on the first side 800 for receiving the adjustable length cinch strap 786 therethrough.

The fourth retaining loop portion 1026 is coupled to the fourth end portion 904 utilizing stitches 1070, 1071. In an exemplary embodiment, the stitches 1070, 1071 are lock stitches. The fourth retaining loop portion 1026 forms an aperture 1073 between the fourth retaining loop portion 1026 and the fourth end portion 904, for receiving the adjustable length cinch strap 786 therethrough. The fourth retaining loop portion 1026 is constructed of a canvas material.

The fifth retaining loop portion 1028 is coupled to the fourth end portion 904 utilizing stitches 1080, 1081. In an exemplary embodiment, the stitches 1080, 1081 are lock stitches. The fifth retaining loop portion 1028 forms an aperture 1083 between the fifth retaining loop portion 1028 and the fourth end portion 904, for receiving the adjustable length cinch strap 786 therethrough. The fifth retaining loop portion 1028 is constructed of a canvas material.

The sixth retaining loop portion 1030 is coupled to the fourth end portion 904 utilizing stitches 1090, 1091. In an exemplary embodiment, the stitches 1090, 1091 are lock stitches. The sixth retaining loop portion 1030 forms an aperture 1093 between the sixth retaining loop portion 1030 and the fourth end portion 904, for receiving the adjustable length cinch strap 786 therethrough. The sixth retaining loop portion 1030 is constructed of a canvas material.

Referring to FIGS. 16 and 17, the cargo retaining sheet 780 further includes retaining loop portions 1110, 1112, 1114 coupled to the interior sheet portion 910 on the first side 800 wherein each of the retaining loop portions 1110, 1112, 1114 can hold the carabiner 788 (shown in FIG. 3) thereon.

The retaining loop portion 1110 is coupled to the interior sheet portion 910 utilizing stitches 1120, 1121, 1122, 1123, 1124, and forms apertures 1130, 1131, 1132, 1133 between the retaining loop portion 1110 and the interior sheet portion 910. The retaining loop portion 1110 is constructed of a canvas material.

The retaining loop portion 1112 is coupled to the interior sheet portion 910 utilizing stitches 1140, 1141, 1142, 1143, 1144, and forms apertures 1150, 1151, 1152, 1153 between the retaining loop portion 1112 and the interior sheet portion 910. The retaining loop portion 1112 is constructed of a canvas material.

The retaining loop portion 1114 is coupled to the interior sheet portion 910 utilizing stitches 1160, 1161, 1162, 1163, 1164, and forms apertures 1170, 1171, 1172, 1173 between the retaining loop portion 1114 and the interior sheet portion 910. The retaining loop portion 1114 is constructed of a canvas material.

Referring to FIG. 22, the cargo retaining sheet 780 further includes a backing layer 1190 that is coupled to the interior sheet portion 910 on the second side 802 utilizing stitches 1192, 1194. The stitches 1192, 1194 are lock stitches. The retaining loop portion 1190 is constructed of a canvas material. An advantage of the backing layer 1190 is that backing layer 1190 provides an additional layer to prevent the cargo retaining sheet 780 from ripping due to cargo pressing against the backing layer 1190.

Referring to FIGS. 13, 18, 20, 23 and 24, the first adjustable length strap 782 extends through the first aperture 1010 in the cargo retaining sheet 780 and is further attachable to the truck 720. The first adjustable length strap 782 includes first and second strap portions 1300, 1302 (shown in FIG. 13), an over-center buckle 1304, and first and second hooks 1306, 1308. The first strap portion 1300 is coupled to the first hook 1306 and to the over-center buckle 1304. The second strap portion 1302 is coupled to the over-center buckle 1304, extends through the aperture 1010, and is coupled to the second hook 1308. The over-center buckle 1304 allows a user to adjust an effective length of the second strap portion 1302. As illustrated, the first hook 1306 is attached to the attachment bracket 750 (shown in FIG. 12) of the truck 720. Further, the second hook 1308 is attached to the attachment bracket 750.

Referring to FIGS. 13, 19 and 22, the second adjustable length strap 784 extends through the second aperture 1012 in the cargo retaining sheet 780 and is further attachable to the truck 720. The second adjustable length strap 784 includes first and second strap portions 1350, 1352 (shown in FIG. 13), an over-center buckle 1354, and first and second hooks 1356, 1358. The first strap portion 1350 is coupled to the first hook 1356 and to the over-center buckle 1354. The second strap portion 1352 is coupled to the over-center buckle 1354, and extends through the aperture 1012, and is coupled to the second hook 1358. The over-center buckle 1354 allows a user to adjust an effective length of the second strap portion 1352. The first hook 1356 is attached to the attachment bracket 748 of the truck 720. Further, the second hook 1358 is attached to the attachment bracket 748.

Referring to FIGS. 11, 14 and 25, the adjustable length cinch strap 786 is coupled to the cargo retaining sheet 780 and extends through apertures formed by the first, second, third, fourth, fifth, and sixth retaining loop portions 1020, 1022, 1024, 1026, 1028, 1030. The adjustable length cinch strap 786 includes a strap portion 1400 (shown in FIG. 25) and a side squeeze buckle 1402. The side squeeze buckle 1402 includes a male buckle portion 1410 and a female buckle portion 1412. The male buckle portion 1410 is removably received within the female buckle portion 1412. The effective length of the adjustable length cinch strap 786 can be adjusted by adjusting a length of an end portion 1420 relative to the male buckle portion 1410. An advantage of the adjustable length cinch strap 786 is that the strap 786 holds the sheet 780 relatively tightly against cargo which prevents the sheet 780 from acting like a parachute in the wind when the cargo is being transported at relatively high speeds.

Referring to FIGS. 10, 13 and 16, the carabiner 788 is provided to couple the flag 790 to the cargo retaining sheet 780. The carabiner 788 extends through an aperture in the flag 790, and further extends through an aperture formed by one of the retaining loop portions 1110, 1112, 1114 to couple the carabiner 788 to both the cargo retaining sheet 790 and the flag 790.

The cargo restraint systems described herein provide a substantial advantage over other systems. In particular, each cargo restraint system allows a user to quickly and securely fasten cargo while simultaneously preventing the cargo from being damaged or dislodged during transit. Further, each cargo restraint system utilizes a solid cargo retaining sheet that encloses and secures cargo and eliminates the drawback of allowing smaller items to pass through a cargo net. Also, each cargo retaining sheet encloses cargo vertically by having upper and lower sections thereof disposed on the top and bottom portions, respectively, of an extended part of the cargo, as well longitudinally securing the cargo by folding the sheet over the cargo. Further, one of the cargo restraint systems utilizes an adjustable length cinch strap that tightly holds the cargo retaining sheet against the cargo which prevents the sheet from acting like a parachute in the wind when the cargo is being transported at relatively high speeds.

While the claimed invention has been described in detail in connection with only a limited number of embodiments, it should be readily understood that the invention is not limited to such disclosed embodiments. Rather, the claimed invention can be modified to incorporate any number of variations, alterations, substitutions or equivalent arrangements not heretofore described, but which are commensurate with the spirit and scope of the invention. Additionally, while various embodiments of the claimed invention have been described, it is to be understood that aspects of the invention may include only some of the described embodiments. Accordingly, the claimed invention is not to be seen as limited by the foregoing description.

What is claimed is:

1. A cargo restraint system for securing cargo on a truck bed of a truck, comprising:

a rectangular cargo retaining sheet having first, second, third, and fourth end portions and an interior sheet portion, the third and fourth end portions extending between the first and second end portions, the interior sheet portion being disposed between the first and second end portions and directly contacting the first, second, third, and fourth end portions, the first and second end portions extending parallel to a longitudinal axis of the rectangular cargo retaining sheet and being spaced apart from another, the third and fourth end portions extending perpendicular to the longitudinal axis of the rectangular cargo retaining sheet and being spaced apart from another;

the first end portion being folded back onto the interior sheet portion along an entire longitudinal length of the rectangular cargo retaining sheet, and the first end portion being coupled to the interior sheet portion utilizing a first plurality of stitches extending through the first end portion and the interior sheet portion such that a first aperture is formed by the first end portion and extends parallel to the longitudinal axis along the entire longitudinal length of the rectangular cargo retaining sheet;

the second end portion being folded back onto the interior sheet portion along the entire longitudinal length of the rectangular cargo retaining sheet, and the second end portion being coupled to the interior sheet portion utilizing a second plurality of stitches extending through the second end portion and the interior sheet portion such that a second aperture is formed by the second end portion and extends parallel to the longitudinal axis along the entire longitudinal length of the rectangular cargo retaining sheet;

a first adjustable length strap that extends through the first aperture in the rectangular cargo retaining sheet and is attachable to the truck;

a second adjustable length strap that extends through the second aperture in the rectangular cargo retaining sheet and is attachable to the truck;

a first retaining loop portion being coupled to an outer surface of the interior sheet portion utilizing third and fourth plurality of stitches that extend parallel to one another and perpendicular to the longitudinal axis, the first retaining loop portion forming a third aperture between first retaining loop and the interior sheet portion;

a second retaining loop portion being coupled to the outer surface of the interior sheet portion utilizing fifth and sixth plurality of stitches that extend parallel to one another and perpendicular to the longitudinal axis, the second retaining loop portion forming a fourth aperture between second retaining loop and the interior sheet portion;

a third retaining loop portion being coupled to the outer surface of the interior sheet portion utilizing seventh and eighth plurality of stitches that extend parallel to one another and perpendicular to the longitudinal axis, the third retaining loop portion forming a fifth aperture between third retaining loop and the interior sheet portion;

a fourth retaining loop portion being coupled to the outer surface of the interior sheet portion utilizing ninth and tenth plurality of stitches that extend parallel to one another and perpendicular to the longitudinal axis, the fourth retaining loop portion forming a sixth aperture between fourth retaining loop and the interior sheet portion; and an adjustable length cinch strap extending through the third, fourth, fifth, and sixth apertures of the first, second, third, and fourth retaining loop portions, respectively.

* * * * *